United States Patent Office 2,908,724
Patented Oct. 13, 1959

2,908,724

OXYBROMINATION OF CHLORODIFLUORO-METHANE

Robert P. Ruh and Ralph A. Davis, Midland, Mich., assignors to The Dow Chemical Company, Midland, Mich., a corporation of Delaware No Drawing. Application November 13, 1958
Serial No. 773,548

2 Claims. (Cl. 260—653.8)

This invention relates to the bromination of chlorodifluoromethane in the presence of oxygen, such reaction being referred to hereinafter as oxybromination.

It is known that polyhalomethanes containing at least one hydrogen atom and at least one fluorine atom in the molecule, e.g. difluoromethane, trifluoromethane, and chlorodifluoromethane, can be thermally brominated. The bromination of chlorodifluoromethane proceeds according to the following equation:

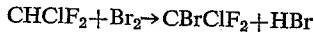
$$CHClF_2 + Br_2 \rightarrow CBrClF_2 + HBr$$

Such a thermal bromination is very inefficient in the utilization of bromine, however, since for every atom of bromine replacing a hydrogen atom in the reactant polyhalomethane molecule, one atom of bromine is consumed in the formation of a molecule of by-product hydrogen bromide.

It has now been found that when a mixture of bromine and oxygen is contacted with chlorodifluoromethane at an elevated temperature in the presence of a salt or an oxide of vanadium as catalyst, an oxybromination reaction occurs in accordance with the following overall equation:

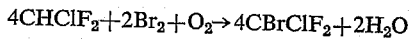
$$4CHClF_2 + 2Br_2 + O_2 \rightarrow 4CBrClF_2 + 2H_2O$$

Under optimum reaction conditions, high conversions and yields of $CBrClF_2$ are obtained with little if any formation of by-product hydrogen bromide. That this reaction will proceed at all is quite unexpected since, under similar conditions, both $CH_2F_2$ and $CHF_2$ decompose with the liberation of large quantities of hydrogen fluoride, practically no brominated products being formed.

According to the process of the present invention, a mixture of oxygen and bromine in a mole ratio of at least 0.5:1 are heated together with chlorodifluoromethane to a reaction temperature above about 300° C. in the presence of a salt or oxide of vanadium as a catalyst. This is conveniently carried out by passing a mixture of $CHClF_2$, $Br_2$, and $O_2$ through a heated bed of the catalyst in any suitable reaction vessel.

The catalysts which are effective in the instant process are oxides and inorganic salts of vanadium. These catalysts may be pelleted and employed per se. Ordinarily, however, they are prepared by treating a suitable support, such as alumina, calcium fluoride, or copper gauze, with an aqueous solution of an inorganic acid salt of vanadium, for example, the nitrate, sulfate, chloride, or other halides, or, vanadates, such as ammonium, tin, potassium, and then mildly heating to remove water, or heating at an elevated temperature to convert the salt to vanadium oxide. In carrying out the instant process, the dry salt is sometimes transformed into the oxide or a halide, e.g. a fluoride. Ammonium metavanadate is especially desirable and is readily converted to vanadium pentoxide upon heating in the presence of oxygen, e.g. air.

The oxybromination of $CHClF_2$ to $CBrClF_2$ is carried out at a reaction temperature above 300° C. but below the temperature at which decomposition becomes pronounced as evidenced by the formation of hydrogen fluoride. This decomposition temperature varies according to the reaction conditions, e.g. reactant ratio, contact time, etc. For all practical purposes, the reaction temperature can be restricted to the range of from 300° to 600° C., with a temperature in the range of from 400° to 550° C. ordinarily preferred for best results.

The temperature at which the oxybromination reaction is conducted governs to a large extent the contact time, i.e. residence time in the reaction zone. In general, a sufficiently long time of contact is employed to effect the desired reaction at a given temperature, the contact time varying inversely as the temperature. For example, a contact time as long as 75 seconds may sometimes be employed at 300° C. At a temperature of 600° C., however, a contact time of only a fraction of a second may be used. Ordinarily, it is preferred to use a contact time of from 1 to 30 seconds.

For maximum conversion of $CHClF_2$ to $CBrClF_2$, it is desirable to employ $CHClF_2$ and $Br_2$ in a reactant ratio closely approximating the stoichiometric proportion of 2:1. A mere trace of bromine, though effective, is impractical, in the oxybromination reaction. Although excess bromine may be employed, a large excess of bromine over the stoichiometric proportion required to prepare $CBrClF_2$ is unnecessary. In ordinary practice, from 0.25 to 0.5 of a mole of $Br_2$ per mole of $CHClF_2$ is employed in carrying out the instant process. With respect to the oxygen, at least 0.5 mole of $O_2$ per mole of $Br_2$ is generally used, good results being obtained when oxygen and bromine are employed in a mole ratio of greater than 4:1, e.g. when passing $CHClF_2$, $Br_2$, and $O_2$ in a mole ratio of 1.0:0.33:1.5 through a bed of a vanadium oxide catalyst at a temperature of 500° C. Although substantially pure oxygen gas is generally preferred for use in the instant process, a gas containing molecular oxygen, e.g. air, may also be effectively employed.

The oxybromination process of the invention may be carried out either batchwise or continuously. Continuous operation is preferred both for ease in carrying out the process and because better yields result. A cylindrical reaction tube constructed of or lined with a material which is inert under the conditions of the reaction is a suitable reaction vessel for such operation.

The following example illustrates, but does not limit the invention.

*Example*

A vanadium oxide catalyst was prepared by wetting aluminum silicate rings with a saturated solution of ammonium metavanadate and heating these wetted rings to 500° C. in the presence of air. A vapor-phase mixture of chlorodifluoromethane, bromine, and oxygen was passed into a three-quarter inch inside diameter vertical silica tube containing a 24 inch bed of catalyst consisting of $V_2O_5$ supported on one-quarter inch rings of aluminum silicate. The catalyst bed was externally heated and maintained at a temperature of 500° C. as measured by a thermocouple placed on the outside of the tube near the middle of the heated zone. The gaseous reactant mixture was formed by passing metered chlorodifluoromethane gas through liquid bromine in a glass vaporizer, the temperature being regulated to give the desired ratio of $Br_2$ to $CHClF_2$. Just prior to entering the top of the reaction tube, metered oxygen gas was introduced into the mixture of bromine and chlorodifluoromethane. During a period of 120 minutes, 0.93 mole of $CHClF_2$, 0.33 mole of $Br_2$, and 0.6 mole of oxygen were passed through the reaction tube. This represents a molar reactant ratio of $CHClF_2:Br_2:O_2$ of 1.0:0.35:0.64 and a contact time of 11.5 seconds. The effluent gas stream was scrubbed with water and condensed in a receiver cooled in solid carbon dioxide. The total condensate weighing 90 grams was scrubbed with aqueous potassium iodide and titrated with standard sodium thiosulfate solution. The bromine recovered as organic product was calculated to be 88 mole percent. Upon fractionally distilling the total organic product in a Podbielniak column, the overall recovery (based on the $CHClF_2$ charged) was 74.1 mole percent as follows:

| | Mole percent |
|---|---|
| $CBrClF_2$ | 61.2 |
| $CBr_2F_2$ | 1.1 |
| $CHClF_2$ | 11.8 |

This application is a continuation-in-part of our copending application, Serial No. 488,700, filed February 16, 1955, now U.S. Patent 2,871,274.

Various modifications may be made in the method of the present invention without departing from the spirit or scope thereof and it is to be understood that we limit ourselves only as defined in the appended claims.

What is claimed is:

1. A method of making $CBrClF_2$ which comprises passing through a bed of a catalyst consisting essentially of vanadium oxide at a reaction temperature in the range of from 300° C. to 600° C. and at a contact time of from 1 to 75 seconds, a vapor phase mixture of $Br_2$, $CHClF_2$, and $O_2$ in a mole ratio of $Br_2$ to $CHClF_2$ of at least 0.25:1 and of $O_2$ to $Br_2$ of at least 0.5:1.

2. A method which comprises passing through a bed of catalyst consisting essentially of $V_2O_5$ at a reaction temperature in the range of from 400° to 550° C. and at a contact time of about 1 to 30 seconds, a vapor-phase mixture of $Br_2$, $CHClF_2$, and $O_2$ in a mole ratio of from 0.25 to 0.50 mole of $Br_2$ per mole of $CHClF_2$, the mole ratio of $O_2$ to $Br_2$ being from about 0.5:1 to about 1:1, and separating $CBrClF_2$ from the resulting product mixture.

No references cited.